Feb. 24, 1959 W. J. DIAMOND 2,874,847
ION EXCHANGE DEVICE AND METHOD
Filed Aug. 11, 1955
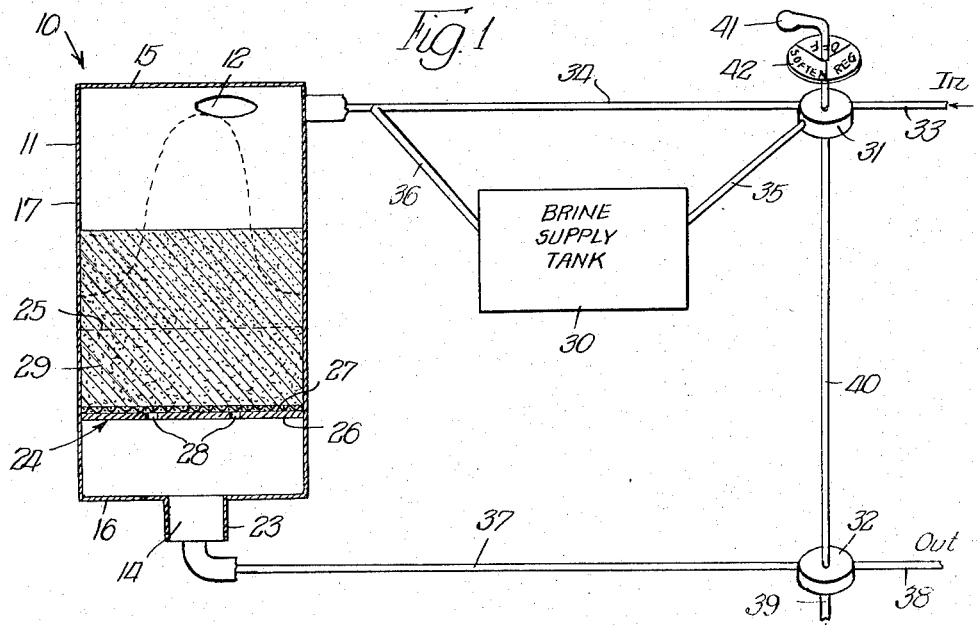
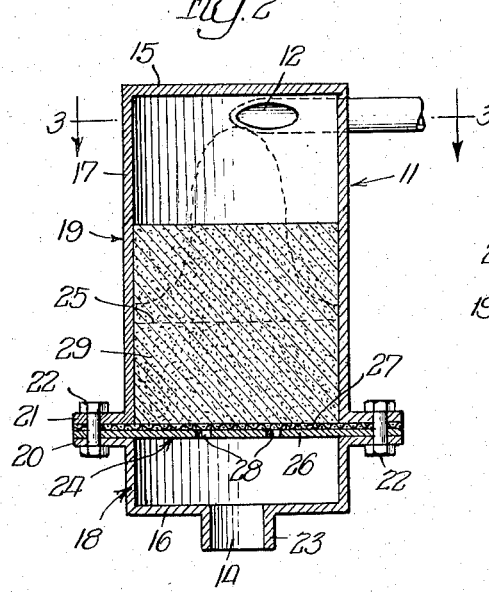
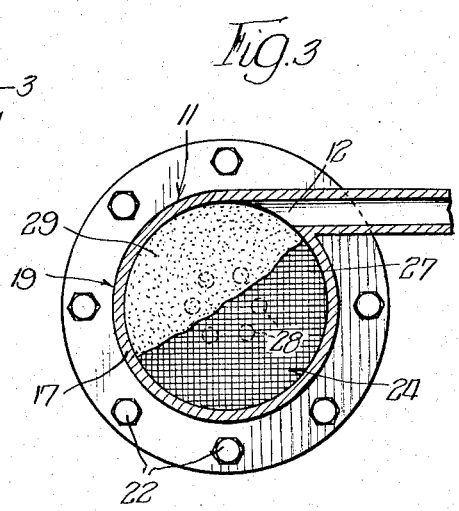
INVENTOR.
William J. Diamond
BY
Brown, Jackson, Boettcher & Dienner

United States Patent Office 2,874,847
Patented Feb. 24, 1959

2,874,847

ION EXCHANGE DEVICE AND METHOD

William J. Diamond, Benton Harbor, Mich., assignor, by mesne assignments, to Whirlpool Corporation, St. Joseph, Mich., a corporation of Delaware Application August 11, 1955, Serial No. 527,806

2 Claims. (Cl. 210—291)

The present invention relates to ion exchange, water softening and the like, and particularly, to an improved ion exchange device and method.

Ion exchange means and methods are widely employed for the selective separation of elements, ions of different elements, or substances in solution, for such purposes as water purification, water softening, concentration of atomic waste, and so on. Ion exchange means for softening hard water are widely employed, commercially and residentially, to remove calcium and magnesium ions from the water. Usually, the calcium and magnesium ions are exchanged for sodium or hydrogen ions by passing the hard water over or through a quiescent bed of ion exchange material rich in sodium or hydrogen ions. As the sodium or hydrogen ion supply is depleted, it is necessary to regenerate the ion exchange material. In the case of the calcium-sodium exchange, regeneration is usually accomplished by reverse flushing the ion exchange material with a brine solution.

The present invention has particular applicability to water softening and is described herein with relation thereto. However, it will be appreciated, as the description proceeds, that the invention is applicable generally to ion exchange means and methods.

Water softening apparatus and methods proposed heretofore suffer many disadvantages, including the bulkiness and expense of the equipment previously deemed essential, the requirement for large quantities of ion exchange material, the necessity for relatively low rates of fluid flow, the inability to achieve uniformity of flow, the formation of a scum or coating on the surface of the ion exchange material which reduces the rate of and capacity for exchange, and the necessity for reverse flow regeneration which compels the provision of a large number of control valves. In terms of productivity and efficiency, the greatest defect of prior proposals in the art is the inability of the same effectively to soften water at high rates of flow.

It is the object of the present invention to overcome the above enumerated disadvantages of known water softening methods and means, and particularly, to afford an improved water softening or ion exchange device and method adapted effectively to soften water, or treat other fluids, at high rates of flow. More specifically, the objects of the invention include the provision of an improved ion exchange method and an improved device for practicing the method, which method and device are characterized in terms of the device by economy, small size, lack of moving parts, a small amount of ion exchange material for a given output, uniform fluid flow, optimum utilization of the ion exchange resin, mitigation of a clogging scum or coating on the resin, elimination of reverse flushing for regeneration, and, of utmost importance, accommodation of rates of flow heretofore deemed impossible in an effective water softening or ion exchange function were to be afforded.

According to the present invention, my improved ion exchange method involves the steps of violently agitating the fluid to be treated with an ion exchange material in a first stage and filtering the fluid through a generally static bed of ion exchange material in a second stage. By virtue of this method, the sum total of the ion exchange material in both stages even at high rates of fluid flow is only a fraction of that required heretofore for effective exchange at many times lower rates of flow. The principal reason for the excellent exchange rate is the agitation and intimate mixing of the fluid and the ion exchange material in the first stage, whereby a small amount of material performs more work in a shorter period of time than would a substantially greater amount of material in a longer time in a quiescent bed. Then, the generally static bed in the second stage of my method need only be relatively shallow in contrast to prior proposals effectively to act as a high speed filter and further exchange medium to insure proper and complete purification and/or softening of the fluid.

In regard to apparatus, it is an object of the invention to afford an ion exchange device or water softener comprising a container of exceptionally small size and having an exceptionally small charge of ion exchange resin in contrast to conventional water softeners of equal output.

Another object of the invention is the provision of an exceedingly small, light weight and economical ion exchange device or water softener that may be utilized as a portable unit, and that is particularly adapted to be incorporated in household appliances, such as clothes washing machines and automatic dishwashers.

A further object of the invention is the provision of an improved ion exchange device or water softener accommodating, during effective ion exchange, rates of fluid flow many times greater than heretofore deemed practical or even possible.

A still further object of the invention is to provide an improved ion exchange device wherein the pressure drop or resistance to flow between the inlet and outlet is very substantially less than the pressure drop in prior art devices of equal output or equal resin charge.

It is also an object of the invention to provide an improved ion exchange device wherein the two stages of the method as heretofore described are combined in a single compartment, wherein the ion exchange material comprises a single charge of resin, and wherein the agitation of the fluid in the first stage is accomplished by novel inlet means to the compartment and the quiescent state of the second stage is accomplished at least in part by novel outlet means.

In addition to the foregoing, it is an object of the invention to provide an improved ion exchange and regenerating system which does not require reverse flushing of the ion exchange resin.

Other objects and advantages of the present invention will become apparent in the following detailed description of one embodiment of the device of the invention, and the related description of the method of the invention.

Now, in order to acquaint those skilled in the art with the method and apparatus of my invention, I shall describe, in connection with the accompanying drawings, a preferred embodiment of the device of my invention and a preferred manner of practicing the method of the invention.

In the drawings:

Figure 1 is a somewhat schematic representation of the simplified ion exchange and regenerating system afforded according to the invention;

Figure 2 is a vertical section of a preferred embodiment of the ion exchange device of the invention; and Figure 3 is a horizontal section of the device taken substantially on line 3—3 of Figure 2, a portion of the charge of ion exchange resin being removed to exhibit the resin retaining screen and the diffusion plate.

Referring now to the drawings, the improved ion exchange device of the invention is indicated generally at 10 as comprising a container 11 having an inlet 12 adjacent one end thereof and an outlet 14 adjacent the other end thereof. The container 11 may be of a variety of cross sectional forms, but in its preferred form, which I believe to be the simplest, the container preferably comprises a cylinder having parallel top and bottom walls 15 and 16, respectively, and a cylindrical side wall 17. In a preferred structure, as shown in Figures 2 and 3, the container is formed of a relatively shallow cup 18 and a relatively deep inverted cup 19 juxtaposed to the cup 18. The two cups are preferably provided with outwardly extending radial flanges 20 and 21, respectively, at their adjacent edges to accommodate convenient assembly of the cups by means of bolts 22 or like fasteners. The outlet 14 is preferably in the form of a relatively large diameter pipe 23 disposed axially of the cylindrical container 11, and in the structure of Figure 2 is formed integrally with the cup member 18.

As will be appreciated from the brief description set forth hereinbefore of the method of the invention, it is necessary that the fluid entering the ion exchange device be turbulent or that a turbulence be created therein upon entry to the device. A variety of means may be utilized to accomplish this purpose and I believe the simplest of these would be the use of wall means in the container so related to the inlet as to create turbulence in the entering water. In other words, a simple baffle arrangement opposed to the jet of fluid entering the device under pressure will create sufficient turbulence for the purposes here involved, and such means affords the advantages of simplicity, economy and lack of moving parts. In the structural embodiment I prefer to adopt, turbulence is created in the fluid stream entering the container 11 by the simple expedient of disposing the inlet 12 generally tangential to the cylindrical side wall 17 of the container. The inlet 12 need not be perfectly tangent to the side wall 17, but may vary several degrees from tangency so long as a portion of the wall 17 adjacent the inlet is disposed in the path of the fluid stream entering through the inlet. Due to the relationship of the inlet 12 and wall means 17 of the container, a violent swirling motion is set up in the entering stream of fluid, which swirling motion or turbulence tends to be dissipated as the fluid flows toward the outlet 14.

The container 11 is formed of a length substantially greater than the length necessary to dissipate the energy or turbulent motion of the entering stream of fluid and in a portion thereof spaced from the inlet beyond the point or area of dissipation is provided with diffusion or retainer means, indicated generally at 24. For example, in the upright installation shown in Figure 1, if the area or point of practical dissipation of the turbulent motion of the fluid is in the vicinity of the horizontal dotted line 25, the diffusion or retainer means 24 is spaced substantially below that line as is shown. And further, the means 24 is spaced somewhat from the outlet 14 of the container. According to the invention, the diffusion or retainer means preferably comprises a diffusion plate 26 supported in the container at right angles to the longitudinal axis of the container and a retaining screen 27 supported by the plate 26 to the side thereof adjacent the inlet 12. In the preferred structure shown in Figures 2 and 3, the plate 26 and screen 27 are preferably of the same diameter as the flanges 20 and 21 of the cups 18 and 19 and are clamped between said flanges by the bolts 22.

The diffusion plate 26 comprises part of the outlet system afforded according to the invention and also assists in the dissipation of turbulent motion or energy in the entering stream of fluid. The general purpose of the plate is to compel uniform diffusion or distribution of fluid to the inlet side thereof throughout the cross sectional area of the container, and at the same time, to accommodate high rates of fluid flow. To these ends, the plate 26 is provided with a large number of holes or apertures 28 arranged in a predetermined pattern. In the embodiment shown, I have found a circular pattern of apertures, of a diameter substantially less than the inner diameter of the container, to be entirely adequate.

The screen 27 may be supported directly on or abutted against the plate 26 and is preferably of a very fine mesh. I have found a screen having 40 weaves to the inch to be highly suitable for specific uses to be described hereinafter. Because of its fine mesh, the screen 27 apparently assists in the diffusion function of the plate 26. However, the general purpose of the screen is to retain a charge of ion exchange resin 29 in the container 11 between the screen and the inlet 12. Specifically, the screen retains the resin in the container and prevents washing of the resin through the outlet 14. The diffusion plate 26 actually supports the charge of resin, and assists in the retaining function in an obvious manner. Thus, the plate 26 and the screen 27 both perform the functions of retaining the resin in the container and diffusing or distributing the fluid evenly or uniformly in the container to the inlet side of the plate, whereby the screen and plate together comprise diffusion and retaining means. Such means readily accommodates high rates of fluid flow and is preferably spaced from the outlet of the container to avoid any possibility of obstruction and to accommodate efficient discharge of treated fluid both from said means and said outlet.

The ion exchange resin disposed within the container may be of any known or necessary nature for particular ion exchanges desired to be accomplished. The charge of resin is retained on the screen 27 and extends therefrom toward the inlet 12, terminating considerably short of the inlet, to comprise a column of resin which in use defines the two stages involved in the method of the invention, as will now be described.

In use, the container 11 of the ion exchange device of the invention is preferably disposed upright as shown in the drawings. As hard water or other fluid to be treated is introduced at relatively high speed into the container through the inlet 12, the fluid strikes the cylindrical wall 17 of the container, whereupon a violent swirling motion is imparted to the fluid. As the swirling fluid gravitates or is forced toward the outlet 14, the fluid contacts the upper surface of the charge of resin 29 adjacent the peripheral margins thereof and picks up particles of resin. Due to the fluid energy, substantial quantities of the resin are taken into mixture with the fluid and the fluid erodes the marginal portions of the upper regions of the charge adjacent the inlet and lifts or elevates the central portion of that region of the charge into a generally conical form substantially axially of the container, whereby the charge attains the general configuration shown in dotted lines in Figures 1 and 2. By virtue of the described action, substantial quantities of ion exchange resin are intimately mixed with the fluid and the exposed surface area of the charge is very substantially increased. Further, the exposed surface of the charge is constantly scrubbed and eroded by the violently swirling fluid to take more resin into mixture and to mitigate formation of a scum or hard coating on the resin. Thus, such a substantial portion of the resin in the region of the inlet is available for efficient ion exchange that the rate of exchange is extremely high, whereby exceptionally high rates of fluid flow through the ion exchange device are facilitated.

Because of the mixing, eroding and scrubbing actions above described, the turbulency or swirling motion of the entering fluid is dissipated at least in part by the resin in the region of the charge adjacent the inlet. Secondly, the turbulency tends to be self-dissipating. Third, the diffusion means 24 tends to maintain a stable or static condition to both sides thereof, since the plate 26 accommodates only flow perpendicular thereto. Also, the screen 27 by its inherent nature tends to retain the resin thereon in a generally static condition. Thus, the diffusion means in a relatively static condition. Thus, the diffusion means exerts a static influence on the column of resin and exhibits a force factor tending to maintain the inertia of the resin, which force is opposed to and assists in dissipating the energy of the entering fluid. Thus, the turbulency of the fluid is dissipated in a relatively short course of flow, approximately to the horizontal dotted line 25, whereby the resin in the region of the charge below the line, i. e., adjacent the diffusion means or outlet, is maintained in a generally quiescent state. The gravitating fluid is then diffused or dispersed quite uniformly or evenly throughout the cross sectional area of the quiescent portion of the charge by virtue of the diffusion means 24, whereby the quiescent resin filters the fluid and performs a further ion exchange function of quite high efficiency to insure proper and complete purification or treatment of the fluid.

In view of the foregoing description of the operation of a preferred embodiment of the ion exchange device of the invention, definition of the method of the invention is more clearly understood as residing in the steps of forcing a fluid to be treated into a turbulent or highly agitated mixture with an ion exchange material in a first stage or space and then filtering the fluid through a second stage or space of a fixed or quiescent bed of ion exchange material. Stated in terms more specific to the preferred physical assembly, the method comprises the steps of creating a turbulent flow of fluid in a first region of an elongate column of ion exchange material, dissipating the turbulence of fluid flow within less than the length of the column, and uniformly filtering the non-turbulent fluid through the remaining region of the column.

As observed hereinbefore, the thorough mixing of the fluid to be treated with the resin in the region of the charge adjacent the inlet insures a high rate of ion exchange. Because of this, the quiescent bed of resin in the region of the outlet need not be particularly deep, especially in view of the uniform dispersion of the fluid therethrough by the diffusion means. Accordingly, the ion exchange material facilitates high rates of fluid flow therethrough, and the diffusion outlet means are formed to accommodate high rates of flow. In terms of rate of flow, I have found that my device and method accommodated ten to twenty times greater flow for a given amount of resin and a given softening function than conventional water softeners. In one series of tests I conducted, utilizing a given depth of ion exchange material, I found that my device and method accommodated more thorough softening of hard water at rates from 9 to 150 gallons per minute per square foot of bed cross section than did conventional softeners at rates of 5 and 10 gallons per minute per square foot of bed cross section.

Because of the increased rates of flow obtained, the invention particularly lends itself to a small size ion exchange device. In a specific example for purposes of softening water, I have embodied my device in a cylindrical body 5 inches in diameter and 10 inches long. In this embodiment, I have utilized a screen 27 having 40 weaves to the inch and a diffusion plate 26 having 20 ⅛ inch diameter holes circularly arranged therein. A practical, efficient unit of this size handling high rates of fluid flow, and thus substantial quantities of water, is a substantial innovation, as will be appreciated by those skilled in the art. Such a unit is particularly useful as a portable unit, and is adapted to be incorporated in automatic dishwashers, clothes washing machines and so on, with obvious advantages. The extreme economy of the unit, as will be appreciated from the foregoing description, insures wide application of the unit in the fields referred to. Because of the small amount of ion exchange resin employed, the resin will have to be regenerated rather often. However, due to the efficient use of the resin, the frequency of regeneration of my improved water softener is not a proportional function to the amount of resin, rate of flow and frequency of regeneration in conventional water softeners.

With respect to regeneration, it is to be observed that reverse flushing of the resin is not required according to the present invention. The intimacy of contact of the fluid entering the inlet with the resin is so complete, as is elimination of a clogging scum or coating on the resin, that no advantage is to be attained by reverse flushing. Secondly, the increased rates of flow and ion exchange accommodated by the device facilitate resin regeneration in a short period of time. Accordingly, regeneration is readily and quickly accomplished. Also, adaption of the present invention to intermittently operated household appliances, such as washing machines, facilitates ready regeneration of the resin as a part of the automatic cycling of the machine, the machine timer being utilized to initiate a regenerating cycle each time the machine is cycled, or consequent upon a predetermined number of times the machine is cycled. In a constant flow system, two alternately connected exchange devices could be employed, one being regenerated while the other performs an exchange function, and even in such case, the overall size, and amount of resin in, the two units would be considerably less than for a conventional unit of comparable output.

Referring now to Figure 1, I have shown for purposes of exemplification a water softener and resin regenerating system involving a manual control, which system comprises the ion exchange device 10, a supply tank 30 for resin regenerating material such as brine, suitable conduit means, and a pair of control valves 31 and 32. The source of water or fluid supply is indicated by a conduit 33 which leads to the first valve 31. An inlet conduit 34 extends between the valve 31 and the inlet 12 of the ion exchange device 10, and the brine supply tank 30 is connected in parallel with the inlet conduit 34, a conduit 35 being provided to connect the brine tank to the valve 31 and a conduit 36 being provided to connect the brine tank to the inlet 12 of the device 10. The outlet 14 of the device 10 communicates through a conduit 37 with the second valve 32, which valve is adapted selectively to establish communication between the conduit 37 and either an outlet conduit 38 or a drain conduit 39. The valves 31 and 32 as represented schematically are preferably rotary valves and the rotary elements thereof are interconnected for conjoint operation by a rod 40 which terminates in a handle 41. The handle 41 is cooperable with an indicator plate 42 which indicates the three positions of the valves, namely, "off," "soften" and "regenerate." In the "off" position, the valve 31 closes off the supply conduit 33, and the valve 32 may suitably close the conduit 37 to prevent fluid flow through the system. In the "soften" position, the valve 31 establishes communication between the conduits 33 and 34 and the valve 32 establishes communication between the conduits 37 and 38, so that hard water or other fluid to be treated flows from the source of supply through the inlet conduit 34 to the inlet of the ion exchange device 10, and from the outlet of the ion exchange device through the conduits 37 and 38 to a point of use. When the handle 41 is turned to the "regenerate" position, the valve 31 establishes communication between the conduits 33 and 35 and the valve 32 establishes communication between the conduits 37 and 39. Under these conditions, water flows from the source of supply to the brine tank 30. The brine tank contains salt which mixes with the water so that brine is discharged from the tank to the inlet 12 of the softener 10 to regenerate the resin in the softener. The brine solution is then discharged through the conduits 37 and 39 to a suitable drain. When regeneration is completed, in a short time as above noted, the handle 41 is returned either to the "off" or "soften"

position as may be desired. No back washing of the resin is required.

In use, I have found that the effectiveness of the ion exchange function is increased as the temperature of the incoming fluid to be treated is increased. Accordingly, where feasible, I prefer to utilize the device of my invention with heated fluids or hot water.

I also prefer to use the ion exchange device of my invention in an upright position as is shown in Figures 1 and 2. However, such mounting is not critical, and various adaptations may be made as required for particular installations. If the device is to be installed other than in an upright position, it may prove advantageous to utilize a second screen in the container, similar to the screen 27, to maintain the second stage or quiescent region of the ion exchange resin in a fixed position, while the region of the resin adjacent the inlet is left free to be mixed with the incoming water, or to gravitate to a position of rest when the device is not in use.

The materials and manner of construction of the ion exchange device of my invention are not critical, except for the screen 27. This screen must be of such mesh as will permit maximum flow and yet retain the ion exchange resin, and the material from which it is formed should not vary dimensionally with wetting and drying. I have found monel wire and nylon gauze to be particularly desirable materials for the screen. As to the container and the diffusion plate, commercial plastics and steel coated with porcelain enamel have proven entirely satisfactory.

While I have described what I regard to be a preferred embodiment of my invention, it is to be appreciated that various changes, rearrangements and modifications may be made therein within the scope of the invention, as defined by the appended claims.

I claim:

1. An ion exchange device or the like comprising a small diameter relatively tall upright cylindrical container having parallel top and bottom walls and a cylindrical side wall, an inlet adjacent the top wall of said container tangential to said cylindrical side wall, an outlet in said bottom wall, a diffusion plate in said container disposed in spaced parallel relation to said top and bottom walls adjacent said bottom wall, said diffusion plate having a plurality of holes therein in a uniform pattern and said outlet being large to accommodate high rates of fluid flow, a fine mesh screen supported on the upper surface of said plate, and a charge of ion exchange resin supported on said screen in said container between said screen and said inlet, said charge of resin being relatively deep but terminating short of said inlet.

2. An ion exchange device or the like comprising a cylindrical container having an inlet adjacent one end thereof and an outlet adjacent the other end thereof, said inlet being disposed generally tangential to the cylindrical wall of said container for imparting a swirling motion to incoming fluid, a diffusion plate having a pattern of apertures therein disposed between said inlet and said outlet, a fine mesh screen supported on said plate to the inlet side thereof, and a charge of loose ion exchange resin supported on said screen and extending to adjacent said inlet but being spaced from said inlet, said charge being of a length to dissipate the swirling motion of the incoming fluid in less than the full length of the charge thereby to define two regions of resin in said charge, a first region adjacent said inlet to be agitated by and in mixture with the incoming fluid and a second, quiescent region adjacent said outlet.

References Cited in the file of this patent

UNITED STATES PATENTS

| | | |
|---|---|---|
| Re. 23,076 | Pick | Jan. 11, 1949 |
| 690,333 | Wanner | Dec. 31, 1901 |
| 776,677 | Paddock | Dec. 6, 1904 |
| 1,195,923 | Gans | Aug. 22, 1916 |
| 1,272,052 | Kennicott | July 9, 1918 |
| 1,557,117 | Sweeney | Oct. 13, 1925 |
| 1,593,300 | Harwood et al. | July 20, 1926 |
| 1,749,422 | Eisenhauer | Mar. 4, 1930 |
| 1,783,255 | Miller | Dec. 2, 1930 |
| 2,015,566 | Lowry | Sept. 24, 1935 |
| 2,222,777 | Linke | Nov. 26, 1940 |
| 2,258,063 | Meyer | Oct. 7, 1941 |
| 2,461,619 | Wolcott | Feb. 15, 1949 |
| 2,773,829 | Hunting | Dec. 11, 1956 |

FOREIGN PATENTS

| | | |
|---|---|---|
| 34,904 | Denmark | Aug. 24, 1925 |

OTHER REFERENCES

Brown et al.: "Unit Operations," 1950, pp. 138-143, John Wiley and Son Inc., N. Y.

Badger and McCabe: "Elements of Chemical Engineering," 1936, pp. 34-40, McGraw-Hill Book Co. Inc.